(12) United States Patent
Boniface

(10) Patent No.: US 10,502,144 B2
(45) Date of Patent: Dec. 10, 2019

(54) GAS TURBINE ENGINE WITH A GEARED TURBOFAN ARRANGEMENT

(71) Applicant: Rolls-Royce Deutschland Ltd & Co KG, Blankenfelde-Mahlow (DE)

(72) Inventor: Dominic Boniface, Berlin (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 134 days.

(21) Appl. No.: 15/708,716

(22) Filed: Sep. 19, 2017

(65) Prior Publication Data

US 2018/0080388 A1    Mar. 22, 2018

(30) Foreign Application Priority Data

Sep. 20, 2016   (EP) .................................. 16189708

(51) Int. Cl.
*F02C 7/36*   (2006.01)
*F01D 25/16*  (2006.01)
*F02K 3/06*   (2006.01)

(52) U.S. Cl.
CPC ................ *F02C 7/36* (2013.01); *F01D 25/16* (2013.01); *F02K 3/06* (2013.01);
(Continued)

(58) Field of Classification Search
CPC .... F02C 7/36; F02C 3/107; F02K 3/06; F02K 3/068; F02K 3/072; F01D 25/16;
(Continued)

(56) References Cited

U.S. PATENT DOCUMENTS 3,997,042 A   12/1976   Longhorn
4,270,408 A    6/1981   Wagner
(Continued)

FOREIGN PATENT DOCUMENTS

DE   102011084360 A1   4/2013
EP        2199568 A2   6/2010
(Continued)

OTHER PUBLICATIONS

Dominic Boniface—U.S. Appl. No. 15/647,953, filed Jul. 12, 2017.
(Continued)

*Primary Examiner* — Ninh H. Nguyen
*Assistant Examiner* — Jesse M Prager
(74) *Attorney, Agent, or Firm* — Shuttleworth & Ingersoll, PLC; Timothy J. Klima

(57) ABSTRACT

A gas turbine engine, in particular an aircraft engine is provided. The gas turbine engine including a geared turbofan arrangement, a propulsive fan and a planetary gearbox being driveably connected with a first shaft on the output side of the planetary gearbox and a second shaft on the input side of the planetary gearbox. The propulsive fan is supported through a front load path and a rear load path, the front load path including a first bearing between the first shaft and a sun gear, the rear load path including a second bearing between the second shaft and a fixed structure of the gas turbine engine. The first shaft including a first portion of the shaft as torque carrying part, wherein the torque carrying part including a torque carrying coupling being connected to the first shaft and to a carrier of the planetary gearbox.

10 Claims, 3 Drawing Sheets

(52) U.S. Cl.
CPC .... *F05D 2220/323* (2013.01); *F05D 2220/36* (2013.01); *F05D 2240/20* (2013.01); *F05D 2240/54* (2013.01); *F05D 2240/60* (2013.01); *F05D 2260/40311* (2013.01)

(58) Field of Classification Search
CPC ........... F05D 2220/323; F05D 2220/36; F05D 2240/20; F05D 2240/54; F05D 2240/60; F05D 2260/40311; F16H 57/087
See application file for complete search history.

(56) References Cited

U.S. PATENT DOCUMENTS

| | | | |
|---|---|---|---|
| 5,533,825 | A | 7/1996 | Stone |
| 7,716,914 | B2 | 5/2010 | Schilling |
| 7,882,693 | B2 | 2/2011 | Schilling |
| 9,353,690 | B2 | 5/2016 | Makulec et al. |
| 2002/0069637 | A1 | 6/2002 | Becquerelle et al. |
| 2005/0220384 | A1 | 10/2005 | Plona |
| 2008/0098717 | A1* | 5/2008 | Orlando ............ F01D 1/24 60/226.1 |
| 2008/0120839 | A1 | 5/2008 | Schilling |
| 2014/0271135 | A1* | 9/2014 | Sheridan ............ F02C 7/36 415/122.1 |
| 2016/0130975 | A1 | 5/2016 | Chilton et al. |
| 2016/0160875 | A1 | 6/2016 | Schwarz |
| 2017/0081973 | A1 | 3/2017 | Swift et al. |
| 2017/0082065 | A1 | 3/2017 | Swift et al. |
| 2017/0175753 | A1 | 6/2017 | Tan-Kim et al. |

FOREIGN PATENT DOCUMENTS

| | | |
|---|---|---|
| EP | 2360391 A1 | 8/2011 |
| EP | 2415991 A2 | 2/2012 |
| EP | 2535528 A2 | 12/2012 |
| EP | 2884056 A1 | 6/2015 |
| EP | 2998557 A1 | 3/2016 |
| EP | 3121469 A1 | 1/2017 |
| FR | 3022890 A1 | 1/2016 |
| GB | 3B2487551 A | 8/2012 |

OTHER PUBLICATIONS

Gideon Venter—U.S. Appl. No. 15/646,775, filed Jul. 11, 2017.
Dominic Boniface—U.S. Appl. No. 15/707,471, filed Sep. 18, 2017.
European Search Report dated Mar. 16, 2017 from counterpart EP App No. 16189708.7.
European Search Report dated Mar. 30, 2017 for related European Application No. 16189699.8.
European Search Report dated Mar. 24, 2017 for related European Application No. 16189712.9.
European Search Report dated Mar. 23, 2017 for related European Application No. 16189697.2.

* cited by examiner

GAS TURBINE ENGINE WITH A GEARED TURBOFAN ARRANGEMENT

REFERENCE TO RELATED APPLICATION

This application claims priority to European Patent Application No. 16 189 708.7 filed on Sep. 20, 2016, the entirety of which is incorporated by reference herein.

BACKGROUND

The invention relates to a gas turbine engine with a geared turbofan arrangement.

Gas turbine engines with geared turbofan arrangements, in particular aircraft engines, require some means to mitigate static and dynamic loads on the gearbox (also called power gearbox) linking a turbine section of the gas turbine engine with the propulsive fan.

The gearbox with a planetary gear arrangement reduces the rotational speed from the turbine section of the gas turbine engine to the propulsive fan, so that the efficiency of the gas turbine engine is improved. With the introduction of the gearbox behind the propulsive fan, the dynamic response of the structure necessitates a bearing arrangement in which the bearings are spaced further apart. Additionally, the deflection of the structure may be a design challenge to meeting propulsive fan tip clearance requirements. During e.g. a fan blade off event, high deflections can lead to failure of the gearbox. In order to design for these deflections and loads, the gearbox size and weight needs to increase. It is known to run a thrust shaft through the center of the sun gear of the planetary gearbox to an intershaft bearing behind the sun gear. This constraints the sun gear diameter resulting from the required diameter of the thrust shaft. Furthermore, the thrust shaft design can collide with the fan blade off conditions.

SUMMARY

The loads on the gearbox can be considerable, so that gas turbine engines with improved stability are required.

This issue is addressed by a gas turbine engine with features as described herein.

The gas turbine engine, in particular an aircraft engine, comprises a geared turbofan arrangement with a propulsive fan and a planetary gearbox being driveably connected with a first shaft on the output side of the planetary gearbox and with a second shaft on the input side of the planetary gearbox, wherein the propulsive fan is supported through a front load path and a rear load path, the front load path (i.e. axially in front of the planetary gearbox) comprising a first bearing between the first shaft and a sun gear, the rear load path (i.e. axially behind the planetary gearbox) comprising a second bearing between the second shaft and a fixed structure of the gas turbine engine. Therefore, the first bearing driveably connects the first shaft, i.e. the shaft driving the propulsive fan, and the sun gear. The second bearing driveably connects the sun gear and some fixed structure of the gas turbine engine. The first shaft comprising a first portion of the shaft as torque carrying part, and a torque carrying part comprising a torque carrying coupling being connected to the first shaft and to a carrier of the planetary gearbox.

In one embodiment, the first bearing is a radial rolling bearing, in particular a tapered roller bearing. The second bearing can e.g. be a radial rolling bearing.

It is also possible that the second shaft, in particular an intermediate pressure shaft, is connected or integral with the sun gear of the planetary gearbox. Alternatively, the sun gear is driven through a spline connection through the second shaft.

In a further embodiment a third bearing is located between the first portion and the second portion of the shaft. The third bearing connects the shaft driveably with a front bearing cone. The third bearing can be a roller bearing or tapered roller bearing.

BRIEF DESCRIPTION OF THE DRAWINGS

Embodiments of the invention are shown in the figures.

DETAILED DESCRIPTION

Figure 1:
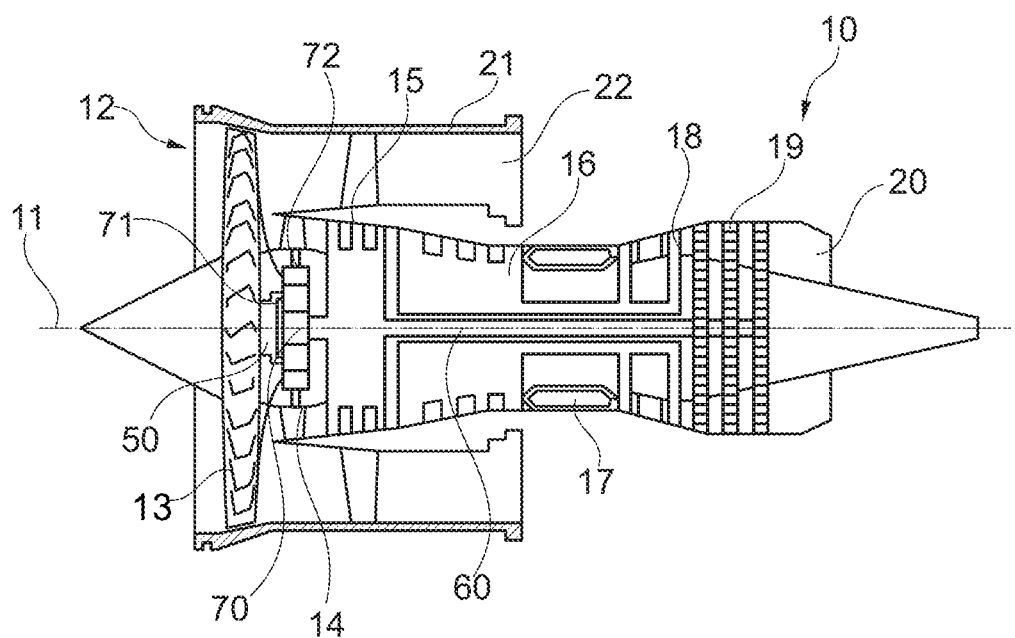
FIG. 1 shows a schematic drawing of a gas turbine engine according to the prior art.

With reference to FIG. 1, a gas turbine engine is generally indicated at 10, having a principal and rotational axis 11. The engine 10 comprises, in axial flow series, an air intake 12, a propulsive fan 13 (could be more than one stage), a planetary gearbox 14, an intermediate pressure compressor 15, a high-pressure compressor 16, combustion equipment 17, a high-pressure turbine 18, an intermediate-pressure turbine 19 and an exhaust nozzle 20. A fan casing 21 generally surrounds the engine 10 and defines the intake 12.

The gas turbine engine 10 works in the conventional manner so that air entering the intake 12 is accelerated by the propulsive fan 13 to produce two air flows: a first air flow into the intermediate pressure compressor 15 and a second air flow which passes through a bypass duct 22 to provide propulsive thrust. The intermediate pressure compressor 15 compresses the air flow directed into it before delivering that air to the high pressure compressor 16 where further compression takes place.

The compressed air exhausted from the high-pressure compressor 16 is directed into the combustion equipment 17 where it is mixed with fuel and the mixture combusted. The resultant hot combustion products then expand through, and thereby drive the high pressure turbine 18 and intermediate pressure turbine 19 before being exhausted through the nozzle 20 to provide additional propulsive thrust. The high pressure turbine 18 and the intermediate pressure turbine 19, respectively, drive the high pressure compressor 16 and the intermediate pressure compressor 15, each by suitable interconnecting shaft assembly.

An intermediate pressure shaft 109 also drives the propulsive fan 13 via the planetary gearbox 14. The planetary gearbox 14 is a reduction gearbox in that it gears down the rate of rotation of the propulsive fan 13 by comparison with the intermediate pressure compressor 15 and intermediate pressure turbine 19.

The planetary gearbox 14 is an epicyclic planetary gearbox having a static ring gear 72, rotating and orbiting planet gears 71 supported by a planet carrier driven by a rotating sun gear 70.

The embodiment shown in FIG. 1 has a specific shaft arrangement which is understood not to be limiting. The embodiments described in the following can also work with a 2- or 3-shaft arrangement.

Figure 2:
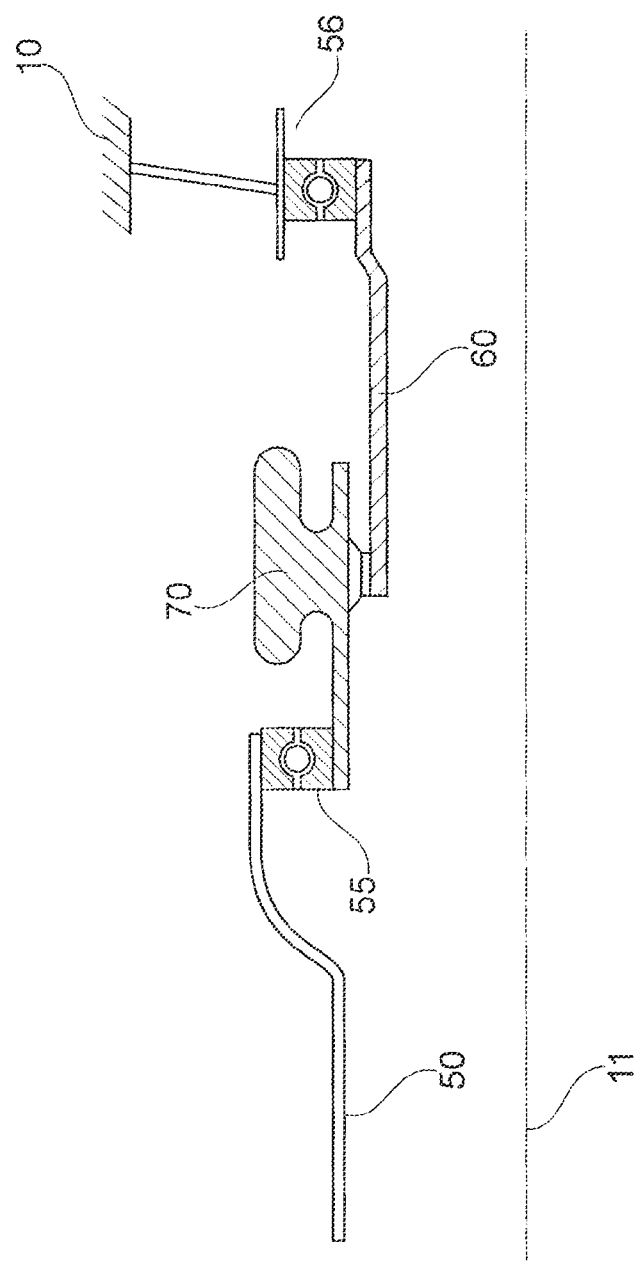
FIG. 2 shows a schematic view of a baseline design of a gas turbine engine with a bearing arrangement.

In FIG. 2 a baseline design of a first embodiment of a connection between shafts 50, 60 and the planetary gearbox 14 is shown. For sake of simplicity only the sun gear 70 of the planetary gearbox 14 is shown.

On the output side, the sun gear 70 is driveably connected with a first shaft 50 driving the propulsive fan 13 (not shown in FIG. 2), in particular with first and second portions 52, 53 (see FIG. 3) of the first shaft 50.

On the input side the planetary gearbox 14 is connected to a second shaft 60, in particular the intermediate pressure shaft 60 of the gas turbine engine 10.

The propulsive fan 13 is supported through a front load path and a rear load path, with the front load path comprising a first bearing 55 axially between the first shaft 50 and the sun gear 70. The first bearing 55 is an intershaft bearing. The rear load path comprises a second bearing 56 between the intermediate pressure shaft 60 and a fixed structure of the gas turbine engine 10.

Figure 3:
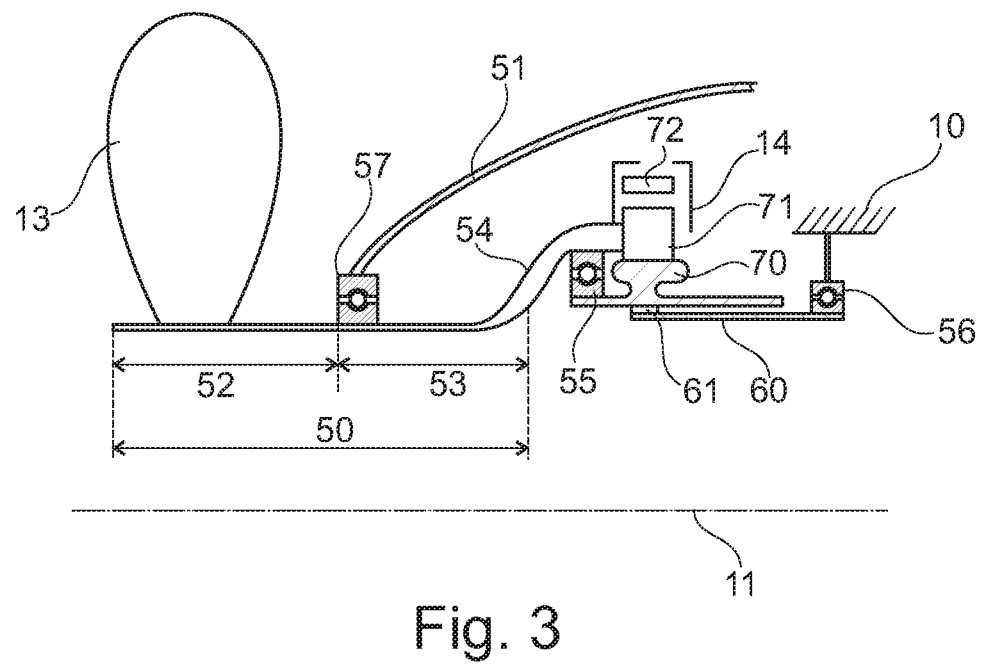
FIG. 3 shows an embodiment with connection as shown in FIG. 2 with a bearing arrangement.

In FIG. 3 a further embodiment for supporting the propulsive fan 13 based on the baseline design shown in FIG. 2 is described.

The shaft 50 on the output side of the planetary gearbox 14 comprises two portions, a first portion 52 and a second portion 53. A front bearing cone 51 is extending from a third bearing 57 at the transition point from the first portion 52 to the second portion 53.

The propulsive fan 13 is supported through a front and a rear load path. The front load path comprises the third bearing 57 positioned on the shaft 50 between the propulsive fan 13 and the planetary gearbox 14.

The propulsive fan 13 is connected to the first portion 52 of the shaft so that it is subjected in particular to a torque load. This torque is transmitted from the planetary gearbox 14 through a torque carrier coupling 54 which also carries a torque load. Hence, the torque generated in the turbine sections 19 is transmitted through the planetary gearbox 14 via the coupling 54 and the fan shaft 52 to the propulsive fan 13.

In the front load path the load from the third bearing 57 is transferred to the structure of the gas turbine engine 10 via the front bearing cone.

Aft of the planetary gearbox 14 the sun shaft, i.e. the intermediate pressure shaft 60, is supported by the second bearing 56 and engine structures 10 (see FIG. 2).

In the embodiments of FIGS. 2 and 3, the sun gear 70 is driven by the intermediate pressure shaft 60 through a spline connection 61.

Figure 4:
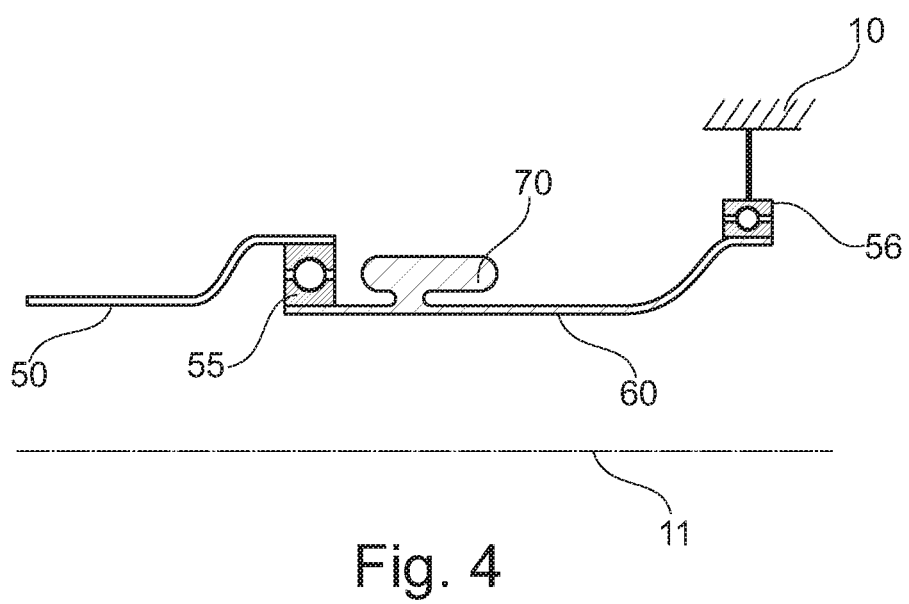
FIG. 4 shows an alternative to the embodiment shown in FIG. 2.

In an alternative embodiment shown in FIG. 4—showing a variation of the baseline design in FIG. 2—the sun gear 70 is integral with the intermediate pressure shaft 60.

During normal operation but also under e.g. a fan blade off event the sun gear 70 follows the deflection of the propulsive fan 13 and the subsequent fan shaft 52 deflection. The deflection of the fan shaft 50 induces a displacement into the sun gear 70 and into the output side of the torque carrier coupling 54. Hence, the sun gear 70 and planetary gears 71 move in unison with the shafts 50, 60 and remain in relative alignment.

In this way, the misalignment through the gear mesh is minimised. Additionally, since thrust shaft 53 is not running through the sun gear 70, there is no inner diameter constraint and a high power density planetary gearbox 14 can be incorporated into the gas turbine engine.

The rear load path of the propulsive fan 13 extends behind the planetary gearbox 14, maximising the stability of the structure.

LIST OF REFERENCE NUMBERS 10 gas turbine engine
11 principal rotational axis
12 air intake
13 propulsive fan
14 planetary gearbox, power gearbox
15 intermediate pressure compressor
16 high-pressure compressor
17 combustion equipment
18 high-pressure turbine
19 intermediate-pressure turbine
20 exhaust nozzle
21 fan casing
22 by-pass duct
50 first shaft
51 front bearing cone
52 first shaft portion
53 second shaft portion
54 torque carrier coupling
55 first bearing, intershaft bearing
56 second bearing
57 third bearing
60 second shaft, intermediate pressure shaft
61 spline connection between sun gear and second shaft
70 sun gear of planetary gearbox
71 carrier of planetary gearbox
72 ring of planetary gearbox

The invention claimed is:

1. A gas turbine engine, comprising:
a propulsive fan,
a first shaft,
a second shaft,
a planetary gearbox including a sun gear, a carrier, an output side and an input side, the planetary gearbox being driveably connected with the first shaft on the output side and with the second shaft on the input side,
wherein the propulsive fan is supported through a front load path and a rear load path, wherein:
the front load path comprises a first bearing as an intershaft bearing between the first shaft and the sun gear,
the rear load path comprises a second bearing between the second shaft and a fixed structure of the gas turbine engine, the second shaft being supported by the second bearing and the fixed structure, and
the first shaft comprises a first portion of the shaft as a torque carrying part,
the torque carrying part comprises a torque carrying coupling being connected to the first shaft and to the carrier,
the propulsive fan is connected to the first shaft and driven by the carrier.

2. The gas turbine engine according to claim 1, wherein the first bearing is a radial rolling bearing.

3. The gas turbine engine according to claim 1, wherein the first bearing is a tapered roller bearing.

4. The gas turbine engine according to claim 1, wherein the second bearing is a radial rolling bearing.

5. The gas turbine engine according to claim 1, wherein the second shaft is connected to or integral with the sun gear of the planetary gearbox.

6. The gas turbine engine according to claim 1, and further comprising a spline connection between the sun gear and the second shaft, wherein the sun gear is driven through the spline connection by the second shaft.

7. The gas turbine engine according to claim 1, and further comprising a third bearing located between the first portion of the first shaft and a second portion of the first shaft.

8. The gas turbine engine according to claim 7, wherein the third bearing is a roller bearing or tapered roller bearing.

9. The gas turbine engine according to claim 5, wherein the second shaft is an intermediate pressure shaft.

10. The gas turbine engine according to claim 1, wherein the gas turbine engine is an aircraft engine with a geared turbofan arrangement.

\* \* \* \* \*